United States Patent
Telesco

(10) Patent No.: US 9,473,453 B2
(45) Date of Patent: Oct. 18, 2016

(54) METHODS, SYSTEMS, AND COMPUTER PROGRAM PRODUCTS FOR TOKENIZED DOMAIN NAME RESOLUTION

(71) Applicant: William James Telesco, Torrington, CT (US)

(72) Inventor: William James Telesco, Torrington, CT (US)

(73) Assignee: Bryte Computer Technologies, Torrington, CT (US)

( * ) Notice: Subject to any disclaimer, the term of this patent is extended or adjusted under 35 U.S.C. 154(b) by 84 days.

(21) Appl. No.: 14/637,090

(22) Filed: Mar. 3, 2015

(65) Prior Publication Data
US 2015/0180828 A1    Jun. 25, 2015

Related U.S. Application Data

(63) Continuation of application No. 11/763,556, filed on Jun. 15, 2007, now Pat. No. 9,015,279.

(51) Int. Cl.
*H04L 29/12* (2006.01)
*G06F 17/30* (2006.01)

(52) U.S. Cl.
CPC ..... *H04L 61/3025* (2013.01); *G06F 17/30876* (2013.01); *H04L 29/12066* (2013.01); *H04L 61/1511* (2013.01); *G06F 17/30* (2013.01); *H04L 61/6068* (2013.01)

(58) Field of Classification Search
CPC .................................................. H04L 61/3025
USPC ........................................................ 709/245
See application file for complete search history.

(56) References Cited

U.S. PATENT DOCUMENTS

| | | | | |
|---|---|---|---|---|
| 6,067,558 A * | 5/2000 | Wendt | G06F 9/5027 | 707/E17.118 |
| 6,182,085 B1 * | 1/2001 | Eichstaedt | G06F 9/5083 | |
| 6,339,423 B1 * | 1/2002 | Sampson | G05B 19/0425 | 709/219 |
| 7,058,626 B1 * | 6/2006 | Pan | G06F 17/30669 | |
| 7,131,009 B2 * | 10/2006 | Scheidt | G06F 21/31 | 705/67 |
| 7,346,649 B1 * | 3/2008 | Wong | G06F 17/30867 | 707/E17.109 |
| 7,814,204 B1 * | 10/2010 | Wang | H04L 12/00 | 707/781 |
| 7,877,793 B2 * | 1/2011 | de Jong | G06F 21/10 | 713/161 |
| 2003/0154293 A1 * | 8/2003 | Zmolek | H04L 63/08 | 709/228 |
| 2003/0191964 A1 * | 10/2003 | Satyavolu | H04L 63/0815 | 726/5 |
| 2004/0044791 A1 * | 3/2004 | Pouzzner | G06F 17/22 | 709/245 |
| 2005/0091321 A1 * | 4/2005 | Daniell | H04L 51/12 | 709/206 |
| 2006/0020684 A1 * | 1/2006 | Mukherjee | H04L 67/06 | 709/219 |
| 2007/0136794 A1 * | 6/2007 | Chin | H04L 63/08 | 726/5 |

OTHER PUBLICATIONS

Microsoft Computer Dictionary, "token", 2002, 5th edition, p. 522.*
Rangarajan et al., "A Technique for User Specific Request Redirection in a Content Delivery Network", 2003.*

* cited by examiner

*Primary Examiner* — O. C. Vostal

(57) ABSTRACT

A method, system, and computer program product for tokenized domain name resolution are provided. The method includes receiving a tokenized domain name, where the tokenized domain name includes a domain name with one or more embedded tokens. The method also includes parsing the tokenized domain name to identify the one or more embedded tokens. The method further includes extracting the one or more embedded tokens from the tokenized domain name, and performing at least one predefined process in response to extracting the one or more embedded tokens. The method may also forward control to the domain name.

20 Claims, 5 Drawing Sheets

METHODS, SYSTEMS, AND COMPUTER PROGRAM PRODUCTS FOR TOKENIZED DOMAIN NAME RESOLUTION

CROSS-REFERENCE TO RELATED APPLICATIONS

This application is a continuation of, and claims priority to, U.S. patent application Ser. No. 11/763,556, filed Jun. 15, 2007, which is hereby incorporated by reference in its entirety:

entitled "METHODS, SYSTEMS, AND COMPUTER PROGRAM PRODUCTS FOR TOKENIZED DOMAIN NAME RESOLUTION".

BACKGROUND OF THE INVENTION

The present disclosure relates generally to computer networks, and, in particular, to methods, systems, and computer program products for tokenized domain name resolution.

In accessing networked computers, domain names are often used as textual substitutes for locating particular Internet protocol (IP) addresses. For example, the domain name "www.example.com" may be equivalent to the IP address: 192.0.34.166. Domain names are typically composed of multiple labels delimited by dots and ending with a top-level domain name. Top-level domain names include well-known names such as ".org", ".com", ".net", and others that provide an initial level of structure to systematically resolve a domain name. When a request is made to access a domain name, a lookup operation is typically performed on a domain name server to translate the domain name into the corresponding IP address, which is utilized by elements of a network infrastructure to route packets to the requested location. When the IP address of a domain name is unknown, a request to resolve the name may be sent to multiple servers to hierarchically resolve the name starting with a root server, such as ".org", down through sub-domains until the domain name is fully resolved.

Some domain names contain one or more sub-domains, such as "www.an.example.com". The addition of sub-domains can increase precision in selecting from different servers at a given domain, but the name resolution process may be handled in a similar manner to domain names that do not include sub-domains by successively analyzing each sub-domain level. Thus, existing domain names and the domain name system in general function much like a phone book, serving as a lookup system to locate information. However, it would be beneficial to enhance the existing domain name system by adding an ability to embed tokens within domain names such that the embedded tokens can be identified and extracted to trigger execution of one or more processes prior to accessing the domain name itself. For example, embedding tokens in a domain name could trigger a variety of processes, such as making a charitable donation prior to transferring control to the domain name. The ability to extract and process embedded tokens from a tokenized domain name may enhance existing domain names through adding functionality prior to visiting a given domain name. Accordingly, there is a need in the art for tokenized domain name resolution.

BRIEF SUMMARY OF THE INVENTION

Embodiments of the invention include a method for tokenized domain name resolution. The method includes receiving a tokenized domain name, where the tokenized domain name includes a domain name with one or more embedded tokens. The method also includes parsing the tokenized domain name to identify the one or more embedded tokens. The method further includes extracting the one or more embedded tokens from the tokenized domain name, and performing at least one predefined process in response to extracting the one or more embedded tokens. The method may also forward control to the domain name.

Additional embodiments include a system for tokenized domain name resolution. The system includes a host system in communication with a network. The host system includes a domain name resolver. The domain name resolver receives a tokenized domain name, where the tokenized domain name includes a domain name with one or more embedded tokens. The domain name resolver also parses the tokenized domain name to identify the one or more embedded tokens, extracts the one or more embedded tokens from the tokenized domain name, and performs at least one predefined process in response to extracting the one or more embedded tokens. The domain name resolver may forward control to the domain name over the network.

Further embodiments include a computer program product for tokenized domain name resolution. The computer program product includes a storage medium readable by a processing circuit and storing instructions for execution by the processing circuit for implementing a method. The method includes receiving a tokenized domain name, where the tokenized domain name includes a domain name with one or more embedded tokens. The method further includes parsing the tokenized domain name to identify the one or more embedded tokens. The method additionally includes extracting the one or more embedded tokens from the tokenized domain name, and performing at least one predefined process in response to extracting the one or more embedded tokens. The method may also forward control to the domain name.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
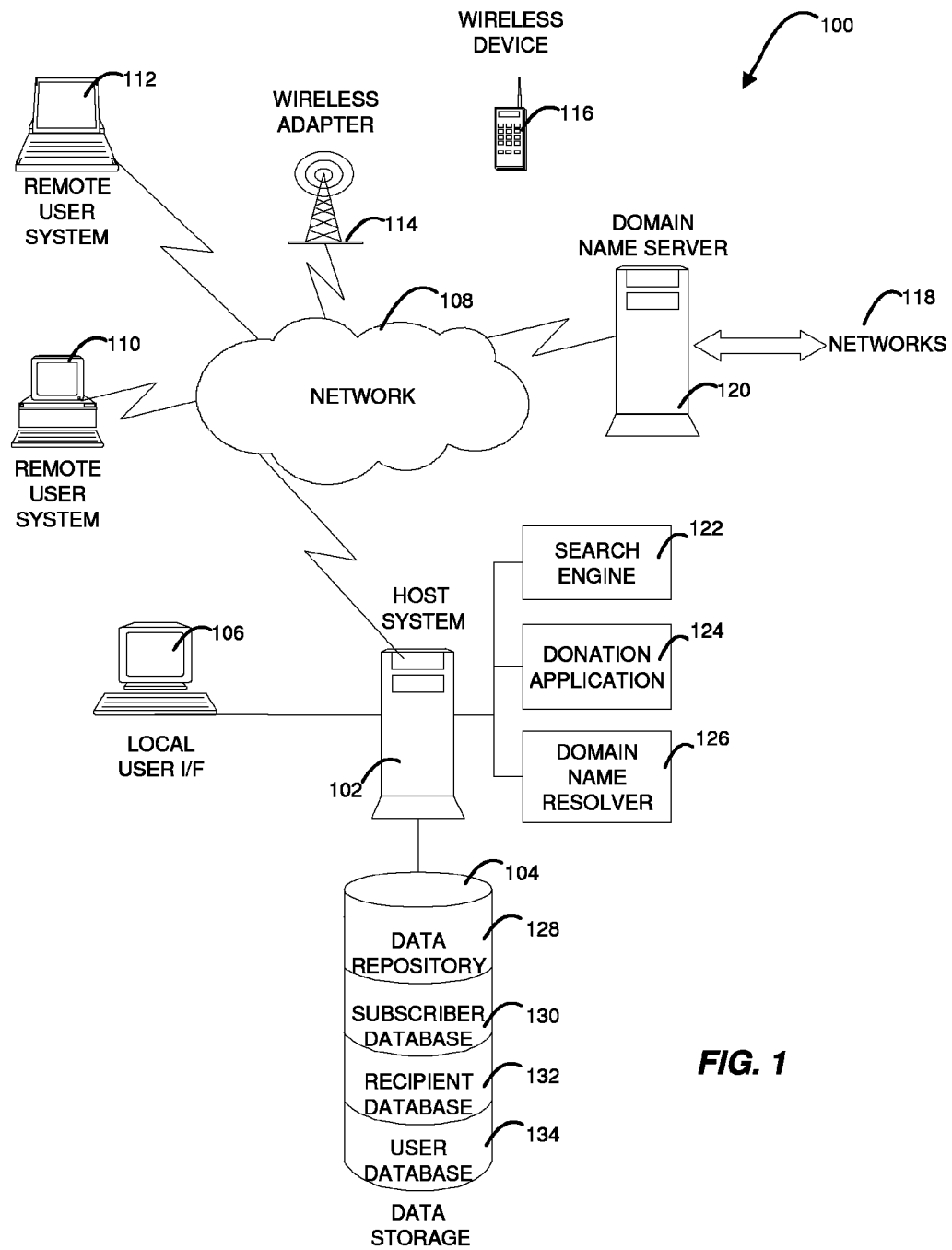
FIG. 1 depicts an exemplary system for charitable computing that may be utilized by exemplary embodiments.

Exemplary embodiments, as shown and described by the various figures and the accompanying text, provide methods, systems and computer program products for tokenized domain name resolution. A "tokenized domain name" refers to an invention as further described herein that adds one or more embedded tokens to a standard domain name. When the embedded tokens are identified and extracted from a tokenized domain name, each token may trigger the performance of a predefined process. Employing embedded tokens in an existing domain name can enable execution of processes before transferring control to the existing domain name. For example, the tokenized domain name "www.pre-example.com" may trigger a charitable donation when the embedded token "pre" is extracted and control is passed to "www.example.com". Inserting a common embedded token for numerous domain names may enhance ease of use and recollection for users. For example, if the embedded token "pre" triggers a charitable donation event, a user desiring to access "www.example.com", "www.example.com", or other existing Web sites can make an intentional choice to insert "pre" into the domain name (e.g., "www.preexample.com" or "www.preexample.com") to trigger a charitable donation event prior to accessing the domain name (e.g., "www.example.com" or "www.example.com"). Therefore, the use of tokenized domain names may enhance user trust, as the user can recognize the action being performed, e.g., making a charitable donation, without forcing the user to pass a request through an additional third party website. While exemplary embodiments are described in reference to making charitable donations, charitable computing, and local/secondary searching and forwarding, it will be understood that any number and variety of processes can be triggered using tokenized domain name embedded tokens.

In computer-based research, users are often in search of information for a variety of reasons, such as academic, business development, shopping, and the advancement of science and technology. As the World Wide Web has continued to expand, the volume of available material has fueled a need for Internet search engines to help users locate desired information. Many Internet search engine operators have profited from user search requests through advertising revenue derived from both advertisements placed on Web pages and sponsored links provided with search results generated in response to user search requests. While some users may not mind that Internet search engine operators profit from the users' activities, other users may prefer to have the power to direct search based revenue to a charitable organization in the form of a charitable donation. Users may also desire to generate charitable donations not only for Internet-based searches, but from localized searches as well. For example, a user's local system or intranet may include a data repository with information or links to information that sufficiently meets the user's needs without performing an Internet search. In exemplary embodiments, a host system performs a local search in response to a search request, and performs a secondary search over a network if the local search fails to locate at least one search result. When either the local or secondary search produces at least one search result, a charitable donation may be made to a charitable organization. Here, the terms "local search" and "secondary search" are broader than merely searching cached data from the Internet, and include searching content that may not be available through an Internet search.

A charitable organization may include any organization that is eligible to receive tax exempt or tax advantaged donations, such as schools, nonprofit organizations, charitable trusts, foundations, and similar entities. For example, any organization qualifying under Internal Revenue Code section 501(c), as well as charitable remainder trusts and charitable lead trusts, may be deemed as charitable organizations. Similar criteria can be applied internationally for organizations located in countries other than the United States of America, e.g., charities registered with the Charity Commission for England and Wales or the Inland Revenue Department for Hong Kong.

In exemplary embodiments, when local and secondary searches fail to locate at least one search result, the search request is forwarded to an external search engine. The search request may also be forwarded to an external search engine when the local and secondary searches are successful, providing a more expansive result set. The external search engine may be any known Internet search engine. The Internet search engine operator may agree to make a charitable donation from revenue generated as a result of receiving the forwarded search request. In alternate exemplary embodiments, the search request is forwarded to the Internet search engine without making a charitable donation. A user performing a search can select a desired Internet search engine to use for a forwarded search. In exemplary embodiments, the Internet search engine is selected by inputting a domain name or via selection from a list of Internet search engines. The user may be notified as to which Internet search engines support making charitable donations to aid the user in Internet search engine selection.

In exemplary embodiments, the host system performing charitable computing is accessible using a standard domain name or a tokenized domain name. A standard domain name refers to a directly accessible domain name, such as "www.example.com", that may be located using techniques known in the art, such as domain name to IP address mapping via a domain name server. A "tokenized domain name" refers to a domain name that includes an embedded token within the domain name that can be extracted and resolved, but may not be directly resolvable as a domain name itself. For example, an embedded token in a domain name could be "pre" or "pre-", such that "www.preexample.com" or "www.pre-example.com" are resolved as a request to run a predefined process and then forward a request to the domain name, e.g., "www.example.com". The predefined process executed upon identification and extraction of the embedded token from the tokenized domain name may be a charitable donation process. Tokenized domain name encoding and token extraction may be applied to a variety of existing domain names, such as Internet search engines, to initiate process execution prior to forwarding a request to the domain name. Further details regarding charitable computing, charitable donation management, and tokenized domain name resolution are provided herein.

Turning now to the drawings, it will be seen that in FIG. 1 there is a block diagram of a system 100 for charitable computing that is implemented in accordance with exemplary embodiments. The system 100 of FIG. 1 includes a host system 102 in communication with a data storage device 104. The host system 102 may be any computing device known in the art capable of receiving and processing a search request. For example, the host system 102 may be a network device, such as a router, a switch, a bridge, a network firewall, a domain name server, a Web server, or a communications server. The host system 102 may also be embodied in a personal computer (PC), a workstation, or a wireless device, such as a cellular phone or a personal digital assistant (PDA). The host system 102 may employ a variety of traditional computer architectures. In alternate exemplary embodiments, the host system 102 employs a controller and resource management system (CARMS) architecture, as described in U.S. patent application Ser. No. 10/811,618 entitled CONTROLLER AND RESOURCE MANAGEMENT SYSTEM AND METHOD WITH IMPROVED SECURITY FOR INDEPENDENTLY CONTROLLING AND MANAGING A COMPUTER SYSTEM, filed on Mar. 29, 2004. U.S. patent application Ser. No. 10/811,618 is incorporated by reference herein in its entirety.

The data storage device 104 may be any non-volatile memory technology known in the art, such as ROM, PROM, EPROM, EEPROM, flash memory, NOVRAM or any other electric, magnetic, optical or combination memory device capable of storing data (i.e., a storage medium). In alternate exemplary embodiments, the data storage device 104 is a secondary storage element, such as a hard disk device. The data storage device 104 may be internal or external to the host system 102, or a combination thereof. While only one data storage device 104 is depicted in FIG. 1, it will be understood that any number of data storage devices may be implemented within the scope of the invention.

In exemplary embodiments, the host system 102 supports local user access via a local user interface (I/F) 106. The local user I/F 106 may include any number of input/output (I/O) devices, such as a graphical display, a keyboard, a mouse, and the like. The local user I/F 106 enables a user to submit a search request and/or a domain name request to the host system 102, along with other typical uses of a computer system.

The host system 102 may communicate with remote systems or devices via a network 108. The network 108 may include a combination of wired, wireless, and fiber optic communication links. The network 108 represents any deployment architecture known in the art, such as the Internet, an intranet, an extranet, a wide area network (WAN), a local area network (LAN), or any combination thereof. In alternate exemplary embodiments, the network 108 includes one or more point-to-point communication links. In exemplary embodiments, communication over the network 108 is formatted as data packets, in compliance with the open systems interconnection (OSI) model, the transmission control protocol/Internet protocol (TCP/IP) model, and/or other communication protocol models.

A variety of remote systems or devices may communicate through the network 108, such as a remote user system 110 (e.g., a desktop PC), a remote user system 112 (e.g., a laptop PC), and a wireless adapter 114 in communication with a wireless device 116. It will be understood that any number of user devices or systems can communicate through the network 108, including other devices known in the art, which are not depicted in FIG. 1, e.g., a PDA. The systems and/or devices in communication through the network 108, including the host system 102, may access other networks 118 via a domain name server 120. In exemplary embodiments, the domain name server 120 performs look-up and translation functions for translating between domain names and IP addresses. In alternate exemplary embodiments, the host system 102 functions as the domain name server 120. While only one host system 102 is depicted in the system 100 of FIG. 1, it will be understood that any number of host systems can be included in the system 100, the combination of which can be in communication with each other or isolated in separate communication paths. In exemplary embodiments, the network 108 includes multiple host systems, such as the host system 102, in communication with each other forming one or more communication fabrics.

In exemplary embodiments, the host system 102 includes a search engine 122, a donation application 124, and a domain name resolver 126. The search engine 122 may be invoked via the local user I/F 106 or through the network 108 (e.g., using the wireless device 116). In exemplary embodiments, when the search engine 122 receives a search request, a data repository 128 on the data storage device 104 is searched for corresponding data. The data repository 128 may include a variety of files, such as Web pages, documents, spreadsheets, databases, and similarly formatted information. It will be understood that the data repository 128 includes content beyond cached data from the Internet, such that searches may locate data that cannot otherwise be located through an Internet-based search. The data within the data repository 128 may be associated with records within a subscriber database 130. The subscriber database 130 may include information regarding both paying and non-paying subscribers, such as a subscriber organization name, an associated uniform resource locator (URL) and/or domain name, billing information, search result statistics (e.g., number of hits per period of time), and other such information. In exemplary embodiments, paying subscribers provide funding for making charitable donations. The paying subscribers may pay different rates based upon organization size, volume of information associated with each subscriber in the data repository 128, desired preferential ranking in search results, security level, and other considerations. Non-paying subscribers, such as non-profit organizations, may be included within the subscriber database 130 and have space allocated in the data repository 128. The subscriber database 130 may also include Internet search engine domain names and/or URLs, as a special class of subscribers that provide indirect funding based on results of search request forwarding. In exemplary embodiments, the subscriber database 130 includes subscribers that agree or otherwise consent to placement within the subscriber database 130.

When a search is performed using the search engine 122, the successful location of one or more search results triggers the donation application 124 to execute. In exemplary embodiments, the donation application 124 manages and administers the process of making charitable donations. The donation application 124 correlates the one or more search results to one or more subscribers in the subscriber database 130, and may generate a donation event upon returning the one or more search results (e.g., donation for placement) or in response to a user selection of the one or more search results (e.g., donation per click). A donation event may also be triggered on forwarding a user request to a subscriber in the subscriber database 130. In exemplary embodiments, the data storage device 104 includes a recipient database 132 that holds information regarding organizations that are eligible to receive a donation. The recipient database 132 may include information such as a mailing address, an account number, a primary contact, an organization type, an organization tax exemption status, donation statistics, and other such information. Organizations in the recipient database 132 can also be listed in the subscriber database 130, for example, as non-paying subscribers. In exemplary embodiments, when a donation event occurs, the donation application 124 determines a user's preferences to target the donation to an organization in the recipient database 132. The user's preferences may be input by the user and held in temporary storage, or the user's preferences may be written to a user database 134. The user may opt to target each donation to a particular organization or spread donations between multiple organizations in the recipient database 132, e.g., 60% to one organization and 40% to another organization.

The donation application 124 may support a number of models for collection and distribution of charitable donations. For example, paying subscribers may be billed directly based on the number of donation events that occur which are associated with the paying subscribers. In alternate exemplary embodiments, the paying subscribers pay a fixed price for membership in the subscriber database 130, and the associated funds received from the paying subscribers are drawn down as donation events occur. Alternatively, funds may be drawn down without regard to a particular subscriber, such that any search results that correspond with any subscriber in the subscriber database 130 produce a general donation event, drawing down the total funds without apportionment to the corresponding subscriber. Billing of paying subscribers may be performed on a periodic basis, e.g., monthly, or when a bill crosses a threshold condition, e.g., more than ten dollars. In similar fashion, organizations in the recipient database 132 may receive donations periodically or when sufficient donations have accrued, e.g., more than ten dollars. Billing and payment information for donation events may be tracked within the subscriber database 130, the recipient database 132, a combination thereof, and/or through an additional database (not depicted).

Although the data storage device 104 is depicted as a single device including various data elements, such as the data repository 128, the subscriber database 130, the recipient database 132, and the user database 134 (collectively referred to as data elements 128-134), it will be understood that the data storage device 104 can be partitioned into any combination of data storage devices and the data elements 128-134 can be merged in any combination. Moreover, each of the data elements 128-134 may include one or more files, tables, or other data structures. The data storage device 104 may also hold executable instructions for part or all of the search engine 122, the donation application 124, and the domain name resolver 126.

In exemplary embodiments, when the search engine 122 fails to locate at least one search result in the data repository 128, the search request may be forwarded to other systems through the network 108. When the network 108 interfaces multiple host systems 102, a failure to locate at least one search result locally may result in forwarding the search request to the other host systems 102 as a secondary search. If the secondary search successfully locates at least one search result, the search result may trigger a donation event on the host system 102 that locates the search result. Alternatively, the host system 102 that initiated the secondary search can trigger a donation event when the secondary search successfully locates at least one search result. If no other systems in communication through the network 108 locate at least one search result, the search may be forwarded to one or more other networks 118. The networks 118 may be accessible through the domain name server 120 or through alternate connection paths (not depicted). In exemplary embodiments, the search request is forwarded to the domain name server 120 with a target domain name for an external search engine, such as an Internet search engine.

The domain name resolver 126 may perform domain name resolution and analysis on the host system 102. In exemplary embodiments, the domain name resolver 126 receives input locally from the local user I/F 106 or remotely from a device or system through the network 108, e.g., from the remote user system 112. Input to the domain name resolver 126 may be received from a Web browser application (not depicted). In alternate exemplary embodiments, the domain name resolver 126 is a component of a Web browser application, such as a plug-in. In exemplary embodiments, the domain name resolver 126 receives a domain name targeting a desired domain name. The received domain name may be an exact match to an existing domain name (e.g., a standard domain name) or may be an existing domain name with an embedded token (e.g., a tokenized domain name). If the received domain name is a domain name other than that of the host system 102, the domain name resolver 126 determines whether the received domain name matches a domain name in the subscriber database 130, e.g., "www.example.com". The domain name resolver 126 may also check the recipient database 132 for a matching domain name as well. If the received domain name is not a direct match, the domain name resolver 126 may perform a tokenized domain name analysis to determine if the received domain name contains an embedded token, such as "pre" or "pre-". While "pre" or "pre-" are exemplary embedded tokens within a tokenized domain name, it will be understood that any embedded token could be inserted into any portion of a domain name within the scope of the invention, including a prefix or a suffix within an existing domain name, e.g., "mcd" in "www.examplemcd.com".

Using tokenized domain name encoding, a charitable donation can be made on any request to transfer control to a given domain name. For example, a user may initiate a request to access a Web site that is external to the host system 102, e.g., "www.example.com", by inputting the domain name as "www.preexample.com". The domain name resolver 126 checks for an exact match of "www.preexample.com" in the subscriber database 130. If an exact match is found, a charitable donation event may be triggered, the embedded token removed, and the user's request processed as a request to access "www.example.com". In alternate exemplary embodiments, the domain name resolver 126 parses all embedded tokens and searches the subscriber database 130 for the domain name without the embedded tokens, e.g. search for "www.example.com" even though "www.preexample.com" was input. The inclusion of different embedded tokens as a tokenized domain name can have different effects. For example, the embedded token "pre" may trigger the donation application 124 to execute using the user's default preference for a donation recipient, while the embedded token "pre1" could select a different user preference, e.g., the first in a preference list in the user database 134 (donate to organization number one). The domain name resolver 126 may support multiple embedded tokens in any portion of a domain name, such as "pre-" and "-post", e.g., "pre-www.example.com-post", with each embedded token triggering a different process.

The domain name resolver 126 may also support domain name switching, including top-level domain name switching. For example, if the domain name resolver 126 receives "www.preexample.org", the embedded token "pre" may trigger a top-level domain name switch or remapping as part of a predefined process, passing a user's request to "www.example.com" instead of "www.example.org". Switching can also be applied at other levels of domain name structure. For example, "www.an.preexample.org" can be switched to "www.example.com", upon performing a predefined process associated with the token "pre". Thus, domain name switching can change a tokenized domain name to a variation of the domain name and exclude embedded tokens. Domain name switching may be useful for organizations that own many domain names and wish to route particular types of requests through a common domain name. For example, an organization that owns multiple domain names can be included in the subscriber database 130. Using domain name switching, all requests resulting in charitable donations sponsored by the organization may be routed through a common "thank you" Web page at a domain name designated by the organization. The domain name switching feature of the domain name resolver 126 is not intended for malicious rerouting of domain names away from the rightful owners of the domain names. To the contrary, domain name switching provides a convenience for holders of many domain names that choose to take advantage of this novel feature.

In exemplary embodiments, when the domain name resolver 126 receives a tokenized domain name that includes an Internet search engine as part of a search request, the Internet search engine is selected as the external search engine to handle a forwarding of the search request. In the following example, "www.genericsearchengine.com" represents any Internet search engine known in the art. If the domain name resolver 126 receives "www.pre-genericsearchengine.com" with a search request of "new cars", the domain name resolver 126 determines whether "www.pre-genericsearchengine.com" or "www.genericsearchengine.com" exists in the subscriber database 130. If neither "www.pre-genericsearchengine.com" nor "www.genericsearchengine.com" are found in the subscriber database 130, the domain name resolver 126 may attempt to forward the "new cars" search request to the domain name server 120, first attempting to send the request to "www.pre-genericsearchengine.com", e.g., the received domain name. If the domain name server 120 cannot resolve "www.pre-genericsearchengine.com" (presumably because it contains an embedded token and is not itself registered as an existing domain name), the domain name server 120 forwards the request to other domain name servers (not depicted) connected to the networks 118. If domain name servers, such as the domain name server 120, cannot resolve "www.pre-genericsearchengine.com", an error message is returned to the host system 102. The domain name resolver 126 may then forward the search request to the domain name server 120 using "www.genericsearchengine.com", i.e., the domain name with the embedded token removed. The process of resolving the domain names in domain name servers repeats, and if the domain name remains irresolvable by the domain name servers, such as the domain name server 120, the domain name resolver 126 reports an error condition to the user.

Continuing with the example, if the domain name resolver 126 determines that either "www.pre-genericsearchengine.com" or "www.genericsearchengine.com" exists in the subscriber database 130, the domain name resolver 126 passes the "new cars" search request to the search engine 122. The search engine 122 may perform a local search of the data repository 128 for "new cars". If the search engine 122 locates at least one search result, a donation event may be triggered depending upon the association of the data located to a subscriber in the subscriber database 130, as previously described. If the search engine 122 fails to locate at least one search result locally, the search engine 122 requests a secondary search of other devices and systems through the network 108. If the secondary search locates at least one search result, a donation event may be triggered depending upon the association of the data located to a subscriber in the subscriber database 130, as previously described. The search request may then be forwarded to the external search engine, at "www.genericsearchengine.com", resulting in a charitable donation if the terms of the donation agreement between the operator of the host system 102 and the external search engine are met, e.g., a portion of pay-per-click revenue from the external search engine is allocated to a user selected recipient in the recipient database 132.

Although a potential exists for abusive behavior in making charitable donations, such as the use of programs attempting to increase charitable donations through automated requests, a number of approaches can be used to reduce abusive behavior. The use of local searches of the data storage device 104 through the host system 102 may inherently reduce the risk of abusive behavior, as a party attempting to run up charitable donations can be identified, providing a deterrent to such behavior. Regulating the types of organizations that can join the recipient database 132 may further reduce abusive behavior by preventing individuals and for-profit organizations from receiving financial benefits. Other limits may include a maximum number of charitable donations per day as controlled by the donation application 124. In exemplary embodiments, attempts to use alternate or modified search terms to trigger charitable donations are prevented through the use of search term encryption. For example, if a malicious third party attempts to modify or add search terms to secondary or forwarded searches in hopes of triggering a charitable donation, the attempts can be filtered and rejected if they fail to comply with the search term encryption format.

Figure 2:
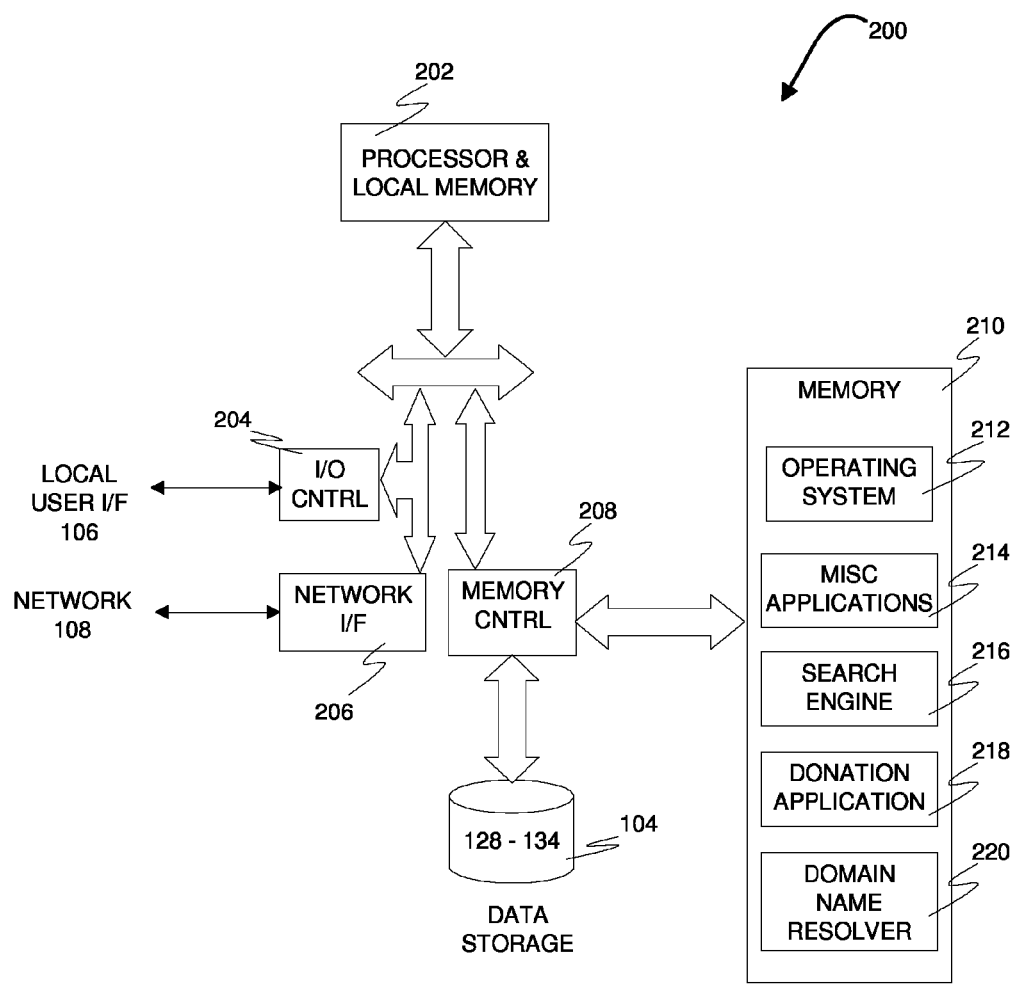
FIG. 2 depicts an exemplary computer architecture of a host system for charitable computing.

Turning now to FIG. 2, an embodiment of the host system 102 of FIG. 1 for charitable computing is depicted as a computer architecture 200. The computer architecture 200 includes a processor and local memory 202, an input/output (I/O) controller 204, a network interface 206, a memory controller 208, and memory 210. It will be understood that other elements known in the art (not depicted) are also included in the computer architecture 200, such as clocks, power supplies, various data and control buses, and the like. The computer architecture 200 merely represents one embodiment of a system for charitable computing and should not be construed as limiting in scope, as many other computer architectures can implement charitable computing.

The processor and local memory 202 may include any microprocessor, microcontroller, digital signal processor (DSP), application specific integrated circuit (ASIC), programmable logic device (PLD), or processing circuit known in the art, along with cache memory and/or other local memory. The processor and local memory 202 may include any number of processing devices as individual devices or an integrated device, e.g., a multi-core/chip module (MCM).

In exemplary embodiments, the I/O controller 204 handles interfacing various I/O devices, such as those described in reference to the local user OF 106 of FIG. 1. For example, the I/O controller 204 may support numerous device interfaces, such universal serial bus (USB) ports, PS/2 ports, a video graphics array (VGA) connector, a digital visual interface (DVI), and other peripheral interfaces. The network OF 206 may include support for Ethernet communications and interface with the network 108 of FIG. 1. In exemplary embodiments, the memory controller 208 manages access to both the data storage device 104 and the memory 210. The data storage device 104 of FIG. 2 may be equivalent to the data storage device 104 of FIG. 1, including all of the data elements 128-134 located therein. Although the data storage device 104 and the memory 210 are depicted separately, it will be understood that the data storage device 104 and the memory 210 may be combined within the scope of the invention.

The memory 210 may be any memory combination of volatile and non-volatile memory technology known in the art, such as RAM, ROM, PROM, EPROM, EEPROM, flash memory, NOVRAM or any other electric, magnetic, optical or combination memory device capable of storing data (i.e., a storage medium), some of which represent executable instructions for the processor and local memory 202. The memory 210 may also represent a secondary storage element, such as a hard disk device, that can be internal or external to the host system 102 of FIG. 1.

In exemplary embodiments, the processor and local memory 202 executes instructions stored in the memory 210, such as an operating system 212, miscellaneous applications 214, a search engine 216, a donation application 218, and a domain name resolver 220. The operating system 212 may be any operating system known in the art capable of providing an application interface, prioritizing system requests, performing memory management, facilitating network communications, and other such tasks. The miscellaneous applications 214 represent other applications that may be executed by the processor and local memory 202, for example, a Web browser application. The search engine 216 of FIG. 2 represents a software embodiment of the search engine 122 of FIG. 1. Similarly, the donation application 218 and the domain name resolver 220 of FIG. 2 represent software embodiments of the donation application 124 and the domain name resolver 126 of FIG. 1. The search engine 216, donation application 218 and domain name resolver 220 may be managed and configured as separate applications or combined into a single comprehensive application. In alternate exemplary embodiments, the search engine 216, donation application 218, and/or domain name resolver 220 are implemented in hardware.

Figure 3:
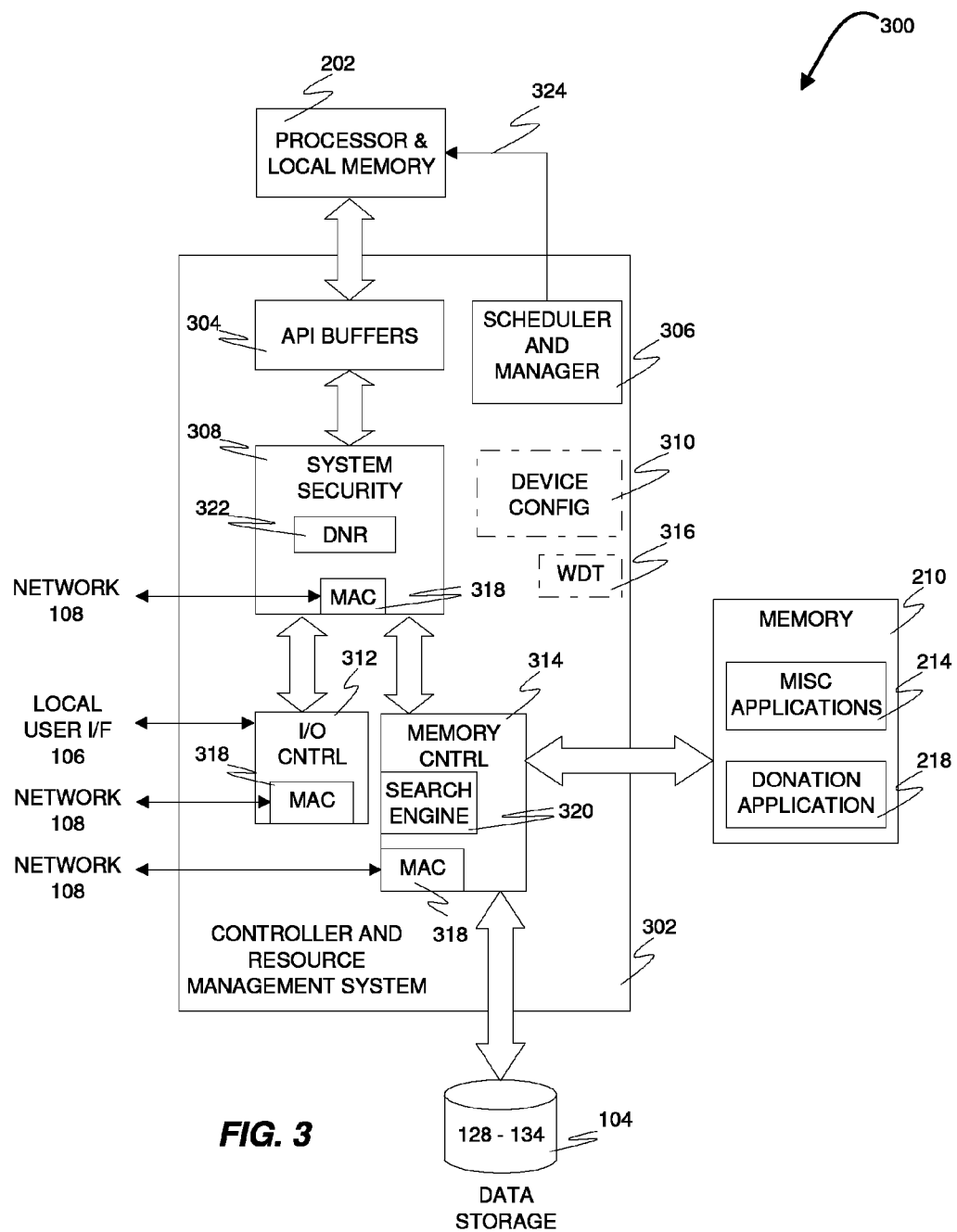
FIG. 3 depicts an exemplary controller and resource management system (CARMS) architecture of a host system for charitable computing.

Turning now to FIG. 3, an embodiment of the host system 102 of FIG. 1 for charitable computing is depicted as a CARMS architecture 300. In exemplary embodiments, the CARMS architecture 300 of FIG. 3 includes a CARMS 302 interfaced with the processor and local memory 202 and the memory 210 of FIG. 2, as well as the data storage device 104 of FIG. 1. Although the CARMS architecture 300 of FIG. 3 includes the memory 210 of FIG. 2, the contents of the memory 210 is different between the computer architecture 200 of FIG. 2 and the CARMS architecture 300 of FIG. 3. In exemplary embodiments, the memory 210 of FIG. 3 includes the miscellaneous applications 214 and the donation application 218 of FIG. 2; however, the functionality of the operating system 212 of FIG. 2 is implemented within the CARMS 302. The CARMS 302 may also implement the functionality of the search engine 122 and the domain name resolver 126 of FIG. 1 within the CARMS 302. In alternate exemplary embodiments, the memory 210 of FIG. 3 includes the search engine 216 and domain name resolver 220 of FIG. 2, but no operating system 212.

In exemplary embodiments, the CARMS 302 includes one or more integrated circuits, such as ASICs or PLDs, for performing enhanced processor and system level control. While other computer architectures, such as the computer architecture 200 of FIG. 2, rely upon a software-based operating system executed by the processor to control the scheduling of software processes and access to lower level interfaces (e.g., the operating system 212 executed by the processor and local memory 202 of FIG. 2), the CARMS 302 controls the processor and local memory 202 of FIG. 3, such that the processor and local memory 202 of FIG. 3 is a slave module to the CARMS 302. Additionally, the CARMS 302 includes additional resource management features for enhanced security and system stability over other computer architectures, such as the computer architecture 200 of FIG. 2.

In exemplary embodiments, the CARMS 302 includes application program interface (API) buffers 304, a scheduler and manager 306, and system security 308, device configuration 310, an I/O controller 312, and a memory controller 314. The CARMS 302 may include a watchdog timer (WDT) 316. The CARMS 302 may further include multiple media access controllers (MACs) 318. The CARMS 302 may also include a hardware embodiment of a search engine 320 and a domain name resolver 322, with functionality as previously described in reference to the search engine 122 and the domain name resolver 126 of FIG. 1. Although the search engine 320 and the domain name resolver 322 can be integrated in any fashion within the CARMS 302, in exemplary embodiments, the search engine 320 is integrated with the memory controller 314, and the domain name resolver 322 is integrated with the system security 308.

The API buffers 304 may provide memory and messaging queues used for communication between the processor and local memory 202 and the functions within the CARMS 302. The CARMS 302 can acquire data from and pass data to the processor and local memory 202 using the API buffers 304. For example, one of the miscellaneous applications 214, such as a Web browser application executed by the processor and local memory 202, can provide a user interface for entering search terms. The CARMS 302 may request that the processor and local memory 202 pass one or more user input search terms via the API buffers 304 to the search engine 320. The search engine 320 can search the data storage device 104 for the one or more user input search terms without intervention from the processor and local memory 202, providing the results either directly (actual results) or indirectly (a reference to the results) through the API buffers 304 for further processing by the processor and local memory 202.

In exemplary embodiments, the scheduler and manager 306 prioritizes and manages tasks that are executed on the processor and local memory 202, controlling when tasks are run by the processor and local memory 202. The scheduler and manager 306 may employ a variety of schemes to determine the order and frequency to schedule tasks. For example, the scheduler and manager 306 may employ weighted round robin scheduling, where tasks are prioritized and processed at different levels, e.g., high, medium, or low. Alternatively, the scheduler and manager 306 may employ a time division multiplexed state machine, where each task has a finite window of time to execute before switching to the next task. In exemplary embodiments, the scheduler and manager 306 can interrupt or hold-off execution of instructions by the processor and local memory 202 via connection 324. The connection 324 may include one or more interrupts or discrete status signals that trigger an interrupt service routine (ISR) on the processor and local memory 202. The ISR may force the processor and local memory 202 to vector to a new process or request a different task through the API buffers 304.

In exemplary embodiments, the system security 308 filters and verifies requests for event or task performance, as well as the contents of data moved through the CARMS 302. The system security 308 may also filter any search terms received. For example, any requests for data or performance of tasks received over the network 108 of FIG. 1 at the MAC 318 are scrutinized by the system security 308. Filtering and verification may include inspecting the permission of a requestor, which can be verified against information stored in the data storage device 104. Likewise, requests received from the processor and local memory 202 may also be filtered and verified. For example, a request by the processor and local memory 202 to access a domain name may be analyzed by the domain name resolver 322 within the system security 308. In exemplary embodiments, the domain name resolver 322 passes a request to the memory controller 314 to search the subscriber database 130 for a domain name or a tokenized domain name. Filtering and verification can be used by the domain name resolver 322 to check a domain name and search terms input via the local user I/F 106 of FIG. 1, as input through the I/O controller 318, parsing and interpreting any tokenized domain name embedded tokens, e.g., "pre". In exemplary embodiments, events or data received by the system security 308 are filtered and verified such that the processor and local memory 202 receive only secure events or data.

In exemplary embodiments, the device configuration 310 includes default settings for the CARMS 302, such as timing, addressing, and security information necessary to initialize the CARMS 302 to a known starting configuration. While no connections are depicted in the CARMS 302 between the device configuration 310 and other blocks, it will be understood that the device configuration 310 can access and modify any portion of the CARMS 302. In alternate exemplary embodiments, the device configuration 310 is distributed locally to each function within the CARMS 302 as default configuration information.

In exemplary embodiments, the WDT 316 provides health-monitoring services for the CARMS 302. The WDT 316 may monitor the performance of various independent clocks (not depicted) within the CARMS architecture 300 to verify that timing constraints are maintained. A failure to maintain the WDT 316 may result in a timeout, resetting the CARMS 302, as well as other elements of the CARMS architecture 300. The WDT 316 provides protection against catastrophic failures and mitigates problems associated with single event, common-mode failures that may affect system timing. In exemplary embodiments, the device configuration 310 configures the WDT 316. In alternate exemplary embodiments, the WDT 316 is configured through the system security 308.

The MACs 318 can be distributed within or interfaced to different components of the CARMS 302, such as the system security 308, the I/O controller 312, and the memory controller 314. In exemplary embodiments, the MACs 318 provide media access control data communication protocol support (e.g., data link layer of the OSI model). The MACs 318 may also support other protocols and communication models. In exemplary embodiments, the MACs 318 interface to the network 108 of FIG. 1 to support communication between multiple devices and systems. When multiple host systems are networked together using the CARMS architecture 300, each MAC 318 may be linked to MACs at the same interface level to form differing levels of communication fabrics. For example, a memory controller fabric can be formed through connecting the MAC 318 in the memory controller 314 between multiple host systems employing the CARMS architecture 300. Similarly, an I/O controller fabric and a security fabric can be created through connecting multiple I/O controllers 312 and security systems 308 together via their respective MACs 318. In alternate exemplary embodiments, each MAC 318 can be used as a general-purpose network interface.

Through the use of the CARMS 302, processes and events may be handled independent of the processor and local memory 202. The independence between the processor and local memory 202 and the CARMS 302 frees the processor and local memory 202 from performing lower level scheduling, flow control, and security functions. In exemplary embodiments, the filtering and verification performed by the system security 308 provides enhanced security and minimizes the risk of harmful applications corrupting data. The filtering and verification performed by the system security 308 may block applications executing on the processor and local memory 202 from accessing non-trusted content, such as domain names that do not include any tokenized domain name embedded tokens or are not located within the subscriber database 130. The system security 308 can also block non-trusted systems or applications from gaining access to the host system 102 and/or the data storage device 104.

Figure 4:
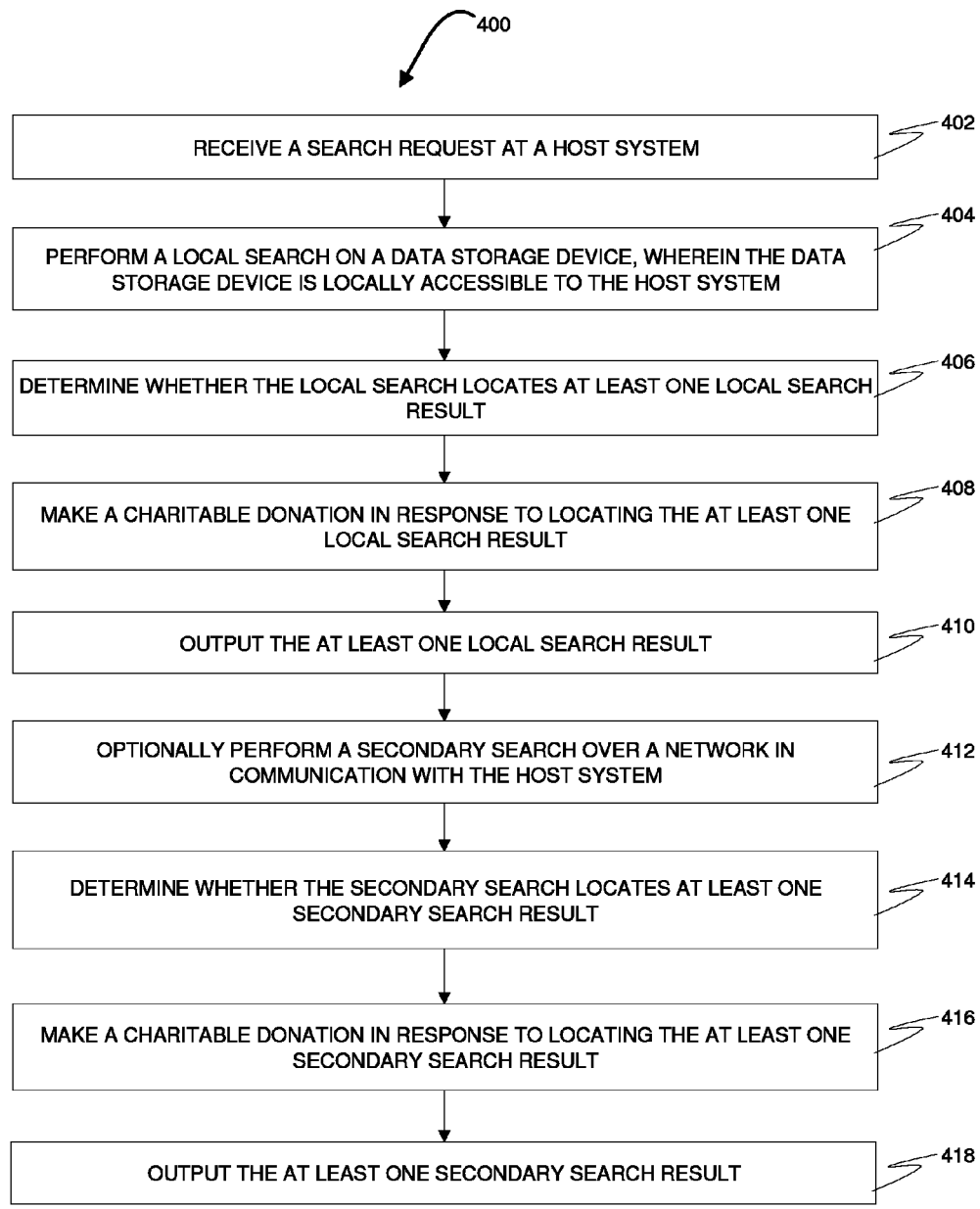
FIG. 4 depicts an exemplary process flow that may be implemented by exemplary embodiments for charitable computing.

Turning now to FIG. 4, a process 400 for charitable computing will now be described in accordance with exemplary embodiments in reference to the system 100 of FIG. 1. In exemplary embodiments, the search engine 122 performs searching associated with charitable computing on the host system 102. The host system 102 may employ a computer architecture, such as the computer architecture 200 of FIG. 2, a CARMS architecture, such as the CARMS architecture 300 of FIG. 3, or other architectures known in the art. At block 402, the search engine 122 receives a search request at the host system 102.

At block 404, the search engine 122 performs a local search on the data storage device 104. The search engine 122 may examine the data repository 128 for one or more local search results corresponding to the search request.

At block 406, the search engine 122 determines whether the local search locates at least one local search result. If search engine 122 fails to locate at least one local search result, the search engine 122 may skip to block 412.

At block 408, the search engine 122 generates a charitable donation event in response to locating the at least one local search result. In exemplary embodiments, the donation application 124 makes a charitable donation in response to the charitable donation event. The donation application 124 may locate subscriber information in the subscriber database 130 corresponding to the at least one local search result, track the located subscriber information in response to performing the local search, and generate a billing event. The donation application 124 may also support selecting a charitable organization from the recipient database to receive the charitable donation. In exemplary embodiments, user preferences, such as a particular charitable organization selected to receive charitable donations, are stored in and retrieved from the user database 134. Charitable organizations may receive charitable donations at a selectable interval, such as periodically or upon crossing a threshold amount, e.g., more than ten dollars. At block 410, the search engine 122 outputs the at least one local search result.

At block 412, the search engine 122 performs a secondary search over the network 108 in communication with the host system 102. At block 414, the search engine 122 determines whether the secondary search locates at least one secondary search result. If the secondary search fails to locate at least one secondary search result, the search engine 122 may forward the search request to an external search engine. The forwarding to the external search engine can also result in a charitable donation. The external search engine may be identified by a requested domain name received at the host system 102. In exemplary embodiments, the domain name resolver 126 determines whether the requested domain name is located in the subscriber database 130. The domain name resolver 126 may also run independently of the search engine 122, responding to a request from other sources, such as a request received via a Web browser application. The domain name resolver 126 may analyze the requested domain name to determine whether the requested domain name is a tokenized domain name with one or more embedded tokens, extracting the one or more embedded tokens from the tokenized domain name, and performing a process in response to the one or more embedded tokens. For example, the process can be the request for a charitable donation via the donation application 124.

At block 416, the search engine 122 generates a charitable donation event in response to locating the at least one secondary search result. In exemplary embodiments, the donation application 124 makes a charitable donation in response to the charitable donation event. The donation application 124 may locate subscriber information in the subscriber database 130 corresponding to the at least one secondary search result, track the located subscriber information in response to performing the secondary search, and generate a billing event. Alternatively, if a remote host system locates at least one secondary search result, the remote host system may generate a billing event locally to the remote host system, i.e., bill at the host system that actually locates a search result. At block 418, the search engine 122 outputs the at least one secondary search result.

Figure 5:
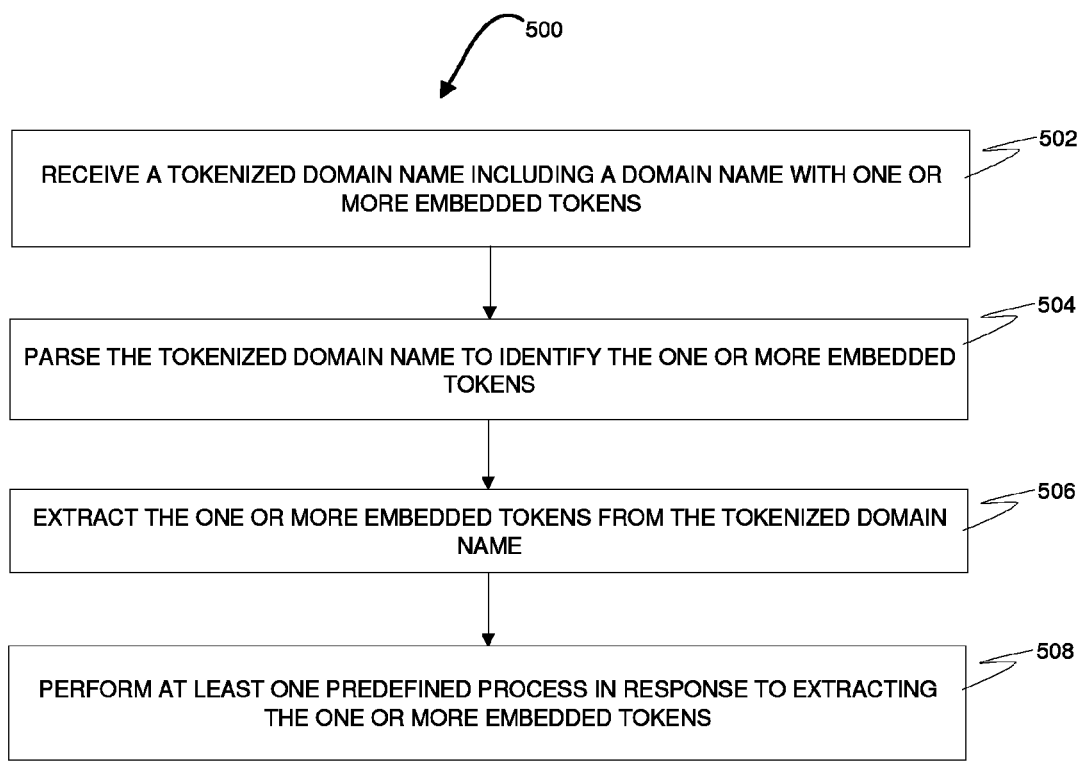
FIG. 5 depicts an exemplary process flow that may be implemented by exemplary embodiments for tokenized domain name resolution.

Turning now to FIG. 5, a process 500 for tokenized domain name resolution will now be described in accordance with exemplary embodiments in reference to the system 100 of FIG. 1. In exemplary embodiments, the domain name resolver 126 performs domain name resolution on the host system 102, including tokenized domain name resolution. The domain name resolver 126 may also process standard domain names without tokenized embedded tokens. The host system 102 may employ a computer architecture, such as the computer architecture 200 of FIG. 2, a CARMS architecture, such as the CARMS architecture 300 of FIG. 3, or other architectures known in the art.

At block 502, the domain name resolver 126 receives a tokenized domain name. The tokenized domain name includes a domain name with one or more embedded tokens. The embedded tokens may appear anywhere within the tokenized domain name, such as a prefix or a suffix. Although embedded tokens can include any combination of characters, numbers, and special characters, exemplary embedded tokens include "pre" and "pre-". An example of a tokenized domain name with two embedded tokens, "pre-" and "-post", is "pre-www.example.com-post".

At block 504, the domain name resolver 126 parses the tokenized domain name to identify the one or more embedded tokens. At block 506, the domain name resolver 126 extracts the one or more embedded tokens from the tokenized domain name. In exemplary embodiments, a tokenized domain name is irresolvable as a domain name prior to extracting any embedded tokens. In alternate exemplary embodiments, a tokenized domain name is resolvable itself as a domain name, even without removing the embedded tokens.

At block 508, the domain name resolver 126 performs one or more predefined processes in response to extracting the one or more embedded tokens. An exemplary predefined process includes making a charitable donation. For example, the predefined process may check whether the domain name exists within the subscriber database 130 and make a charitable donation via the donation application 124 in response to locating a match. The domain name resolver 126 may also forward control or requests to the domain name. For example, if the domain name resolver 126 receives a request from a Web browser application to view a Web page using a tokenized domain name of "www.preexample.com", control can be forwarded to the domain name "www.example.com" with the embedded token "pre" removed. The domain name resolver 126 may also receive one or more search terms that can be in an encrypted format. When the domain name resolver 126 forwards control or requests to the domain name, any search terms may also be forwarded.

Technical effects of exemplary embodiments may include making charitable donations in response to a donation event. A donation event may occur when a search engine locates at least one local and/or secondary search result. The donation event either bills a subscriber or draws down funds from a subscriber account. A user may select one or more recipients to receive charitable donations. A search request may be forwarded to an external search engine to obtain additional results, which may also result in a charitable donation or otherwise benefit a charitable organization.

A further technical effect of exemplary embodiments includes resolving a tokenized domain name that includes one or more embedded tokens. The one or more embedded tokens may trigger the execution of an event, such as performing a local search prior to forwarding control to the domain name. The use of tokenized domain names may enhance user trust, as the user can recognize the action being performed, e.g., making a charitable donation, without forcing the user to pass a request through an additional third party website. Thus, a user's intention to make a charitable donation or perform another predefined process can be easily expressed through inserting one or more embedded tokens in a standard domain name to form a tokenized domain name.

An advantage of exemplary embodiments may include generating charitable donations for activity performed on a local host system, without a need for Internet access. When charitable computing is performed on a host system with a CARMS architecture, additional advantages may be realized through enhanced security that is not available in other computer architectures. Using a CARMS architecture may also increase available processing bandwidth, as control, scheduling, and process management are performed in hardware independent of the main processor and local memory. Through the sale of computers that employ charitable computing, profits can be derived from the sale of the hardware and/or software, while the majority of the funding generated by paying subscribers can be directed to charities.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, universal serial bus (USB) flash drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention.

When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for tokenized domain name resolution comprising:
   receiving a resolvable tokenized domain name, the resolvable tokenized domain name targeting a desired destination domain name system (DNS) server, the resolvable tokenized domain name including a second level domain name, a top level domain name and a predefined token embedded within the tokenized domain name;
   resolving, on a computer, the resolvable tokenized domain name, comprising:
      parsing, on the computer, the resolvable tokenized domain name to identify the embedded predefined token;
      extracting, on the computer, the embedded predefined token from the resolvable tokenized domain name;
      removing, on the computer, the embedded predefined token from the resolvable tokenized domain name resulting in a stripped domain name, the stripped domain name comprising the second level domain name and the top level domain name; and
      performing, on the computer, at least one predefined process in response to extracting the embedded predefined token; and
   transferring the stripped domain name to the desired destination DNS server in response to completing the performing.

2. The method of claim 1 wherein the tokenized domain name includes a search request.

3. The method of claim 1 wherein the tokenized domain name includes a search request for a product.

4. The method of claim 1 wherein the tokenized domain name includes a search request, and the search request results in a donation to a charitable organization.

5. The method of claim 1 further comprising forwarding control to the stripped domain name server.

6. The method of claim 1 further comprising:
   receiving one or more search terms; and
   forwarding the one or more search terms to the stripped domain name.

7. The method of claim 1 further comprising:
   receiving one or more search terms, wherein at least one of the one or more search terms is encrypted.

8. The method of claim 1 wherein the at least one predefined process includes domain name switching from the resolvable tokenized domain name to a variation of the second level domain name excluding the one or more embedded predefined tokens.

9. The method of claim 1 wherein the at least one predefined process includes domain name switching from the resolvable tokenized domain name to a variation of the top-level domain name excluding the one or more embedded predefined tokens.

10. A system for tokenized domain name resolution, comprising:
    a host system in communication with a network, the host system including a domain name resolver, the domain name resolver performing:
       receiving a resolvable tokenized domain name, the resolvable tokenized domain name targeting a desired destination domain name system (DNS) server, the resolvable tokenized domain name including a second level domain name, a top level domain name and a predefined token embedded within the tokenized domain name;
       resolving the resolvable tokenized domain name, comprising:
          parsing the resolvable tokenized domain name to identify the embedded predefined token;
          extracting the embedded predefined token from the resolvable tokenized domain name;
          removing the embedded predefined token from the resolvable tokenized domain name resulting in a stripped domain name, the stripped domain name comprising the second level domain name and the top level domain name; and
          performing at least one predefined process in response to extracting the embedded predefined token; and
       transferring the stripped domain name to the desired destination DNS server in response to completing the performing.

11. The system of claim 10 wherein the tokenized domain name includes a search request.

12. The system of claim 10 wherein the tokenized domain name includes a search request for a product.

13. The system of claim 10 wherein the tokenized domain name includes a search request, and the search request results in a donation to a charitable organization.

14. The system of claim 10 further comprising forwarding control to the stripped domain name server.

15. The system of claim 10 further comprising:
    receiving one or more search terms; and
    forwarding the one or more search terms to the stripped domain name.

16. The system of claim 10 further comprising:
    receiving one or more search terms, wherein at least one of the one or more search terms is encrypted.

17. The system of claim 10 wherein the at least one predefined process includes domain name switching from the resolvable tokenized domain name to a variation of the second level domain name excluding the one or more embedded predefined tokens.

18. The system of claim 10 wherein the at least one predefined process includes domain name switching from the resolvable tokenized domain name to a variation of the top-level domain name excluding the one or more embedded predefined tokens.

19. A computer program product for tokenized domain name resolution, the computer program product comprising:
    a non-transitory computer readable storage medium readable by a processing circuit and storing instructions for execution by the processing circuit for implementing a method, the method comprising:

receiving a resolvable tokenized domain name, the resolvable tokenized domain name targeting a desired destination domain name system (DNS) server, the resolvable tokenized domain name including a second level domain name, a top level domain name and a predefined token embedded within the tokenized domain name;

resolving the resolvable tokenized domain name, comprising:
  parsing the resolvable tokenized domain name to identify the embedded predefined token;
  extracting the embedded predefined token from the resolvable tokenized domain name;
  removing the embedded predefined token from the resolvable tokenized domain name resulting in a stripped domain name, the stripped domain name comprising the second level domain name and the top level domain name; and
  performing at least one predefined process in response to extracting the embedded predefined token; and transferring the stripped domain name to the desired destination DNS server in response to completing the performing.

20. The computer program product of claim 19 wherein the at least one predefined process includes domain name switching from the resolvable tokenized domain name to a variation of the resolvable tokenized domain name excluding the embedded predefined token.

* * * * *